United States Patent
Lee et al.

(10) Patent No.: US 10,138,964 B2
(45) Date of Patent: Nov. 27, 2018

(54) ELECTROMECHANICAL BRAKE DEVICE AND METHOD OF CONTROLLING THE SAME

(71) Applicant: Hyundai Motor Company, Seoul (KR)

(72) Inventors: Joung Hee Lee, Gyeonggi-do (KR); Jong Yun Jeong, Gyeonggi-do (KR); Dong Yoon Hyun, Seoul (KR)

(73) Assignee: Hyundai Motor Company, Seoul (KR)

( * ) Notice: Subject to any disclaimer, the term of this patent is extended or adjusted under 35 U.S.C. 154(b) by 129 days.

(21) Appl. No.: 15/277,372

(22) Filed: Sep. 27, 2016

(65) Prior Publication Data

US 2017/0321773 A1 Nov. 9, 2017

(30) Foreign Application Priority Data

May 3, 2016 (KR) ........................ 10-2016-0054498

(51) Int. Cl.
| | |
|---|---|
| *F16D 65/18* | (2006.01) |
| *F16D 55/226* | (2006.01) |
| *F16D 66/00* | (2006.01) |
| *F16D 121/24* | (2012.01) |

(Continued)

(52) U.S. Cl.
CPC ........... *F16D 65/18* (2013.01); *F16D 55/226* (2013.01); *F16D 66/00* (2013.01); *F16D 2066/003* (2013.01); *F16D 2066/005* (2013.01); *F16D 2066/006* (2013.01); *F16D 2121/24* (2013.01); *F16D 2125/40* (2013.01); *F16D 2125/48* (2013.01)

(58) Field of Classification Search
CPC .. F16D 65/18; F16D 2121/24; F16D 2125/40; F16D 2125/48
See application file for complete search history.

(56) References Cited

U.S. PATENT DOCUMENTS

| | | | |
|---|---|---|---|
| 2012/0292141 A1* | 11/2012 | Takahashi | ............... F16D 65/18 188/72.3 |
| 2014/0000992 A1* | 1/2014 | Tajima | .................... F16D 65/18 188/72.1 |
| 2017/0009830 A1* | 1/2017 | Masuda | ................ B60T 13/741 |

FOREIGN PATENT DOCUMENTS

| | | |
|---|---|---|
| JP | 2011-080586 A | 4/2011 |
| JP | 2014-019235 A | 2/2014 |
| JP | 2014-214752 A | 11/2014 |

(Continued)

*Primary Examiner* — Melanie Torres Williams
(74) *Attorney, Agent, or Firm* — Mintz Levin Cohn Ferris Glovsky and Popeo, P.C.; Peter F. Corless

(57) ABSTRACT

An electromechanical brake device and a method of controlling the same provide the electromechanical brake device capable of estimating motor characteristics, and the method capable of controlling the electromechanical brake device by estimating motor characteristics. The electromechanical brake device includes a reaction force generating mechanism which is installed between a piston and one side of a caliper housing, generates reaction force applied against straight moving force of the piston, which moves backward in an axial direction, in a direction in which a braking operation is released, and applies reaction force to the piston; a sensor which detects a motor operating state; and a controller which estimates a motor torque constant that represents a correlation between motor electric current and motor rotational torque, based on motor operating state information detected by the sensor when an operation of the motor is controlled.

21 Claims, 7 Drawing Sheets

(51) Int. Cl.
*F16D 125/40* (2012.01)
*F16D 125/48* (2012.01)

(56) References Cited

FOREIGN PATENT DOCUMENTS

| | | |
|---|---|---|
| KR | 2010-0001022 A | 1/2010 |
| KR | 2013-0117235 A | 10/2013 |
| KR | 10-1322594 B1 | 11/2013 |
| KR | 10-1338433 B1 | 12/2013 |
| KR | 10-2014-0030594 A | 3/2014 |

* cited by examiner

ELECTROMECHANICAL BRAKE DEVICE AND METHOD OF CONTROLLING THE SAME

CROSS-REFERENCE TO RELATED APPLICATION

This application claims under 35 U.S.C. § 119(a) the benefit of Korean Patent Application No. 10-2016-0054498 filed on May 3, 2016, the entire contents of which are incorporated herein by reference.

BACKGROUND (a) Technical Field

The present invention relates to an electromechanical brake device and a method of controlling the same, more particularly, to an electromechanical brake device capable of estimating motor characteristics, and a method capable of controlling the electromechanical brake device by estimating the motor characteristics.

(b) Description of the Related Art

In general, a brake device for a vehicle is a device that generates braking force for decelerating or stopping a moving vehicle or maintaining the vehicle in a stopped state, and the braking is carried out while kinetic energy of the vehicle is converted into thermal energy by mechanical friction when the vehicle decelerates and frictional heat is radiated into the atmosphere.

As the brake device for a vehicle, there are a drum type hydraulic brake, a disc type hydraulic brake, and the like, and the disc type hydraulic brake obtains braking force by strongly pressing friction pads against both surfaces of a disc, which rotates together with a wheel, instead of using a drum.

However, the hydraulic brake has a complicated structure because it requires mechanical elements connected to a brake pedal in front of a driver seat, hydraulic piping, elements for controlling hydraulic pressure, and the like.

Therefore, an electromechanical brake (EMB) has been developed and used to simplify a configuration of the brake device.

The electromechanical brake has been developed to be used as an electronic parking brake (EPB), but recently, a field of the electromechanical brake has been expanded such that the electromechanical brake is used as a main brake that substitutes for the hydraulic brake in the related art.

Unlike the typical hydraulic brake, the electromechanical brake refers to a brake device that obtains braking force by pressing a friction pad by using a mechanical mechanism driven by an electric motor.

That is, the electromechanical brake has an actuator including the electric motor that rotates forward and backward in order to perform the braking operation and release the braking operation, and the electromechanical brake operates to press the friction pad using rotational force of the motor so that the friction pad presses the disc (causes friction with the disc) at a time of performing the braking operation.

Compared to the hydraulic brake, the electromechanical brake has a simple structure and a high response speed, and may be more precisely controlled, thereby improving braking safety.

The electromechanical brake is advantageous because braking force is easily controlled, and needs to be essentially applied to implement a brake-by-wire (BBW) system.

Meanwhile, the electromechanical brake is operated by various sensors and electrical devices without being mechanically connected with a driver, and as a result, it is necessarily required to ensure stability against a breakdown of the devices.

For example, a force sensor may be installed in the electromechanical brake, and the force sensor detects a clamping force which is the force with which a piston and a finger portion of a caliper housing press both surfaces of a disc through friction pads.

The electromechanical brake equipped with the force sensor controls torque output of a motor by using a clamping force detection value as feedback information so as to generate desired clamping force and braking force.

However, at the time of a breakdown of the force sensor, it is impossible to detect the clamping force, and as a result, motor torque control and braking force control, which use the clamping force detection value, also cannot be determined.

The above information disclosed in this Background section is only for enhancement of understanding of the background of the invention and therefore it may contain information that does not form the prior art that is already known in this country to a person of ordinary skill in the art.

SUMMARY

The present invention provides an electromechanical brake device capable of estimating motor characteristics at the time of a breakdown of a force sensor, and a method capable of controlling the electromechanical brake device by estimating the motor characteristics at the time of the breakdown of the force sensor.

The present invention also provides an electromechanical brake device capable of estimating motor characteristics in a state in which no force sensor is mounted, and a method of controlling the electromechanical brake device which is capable of controlling the electromechanical brake device by estimating motor characteristics, thereby omitting the force sensor.

In one aspect, the present invention provides an electromechanical brake device including: a piston installed in a caliper housing so as to be movable forward and backward in an axial direction, the piston moving forward in the axial direction so as to press a friction pad for clamping a disc at a time of performing a braking operation, and the piston moving backward in the axial direction at a time of releasing the braking operation; an actuator which includes a motor that provides rotational force for moving the piston; a power converting mechanism that converts rotational force transmitted from the actuator into translational force and transmits the translational force to the piston so as to allow the piston to move forward and backward in the axial direction; a reaction force generating mechanism installed between the piston and one side of the caliper housing, the reaction force generating mechanism generating reaction force applied against straight moving force of the piston, which moves backward in the axial direction, in a direction in which the braking operation is released, and applying the reaction force to the piston; a sensor which detects a motor operating state; and a controller which estimates a motor torque constant that represents a correlation between motor electric current and motor rotational torque, based on motor operating state information detected by the sensor when an operation of the motor is controlled so as to allow the piston to move backward in the axial direction.

In another aspect, the present invention provides a method of estimating a motor torque constant of an electromechanical brake device, which includes: a piston which moves forward in an axial direction so as to press a friction pad for clamping a disc at a time of performing a braking operation and moves backward in the axial direction at a time of releasing the braking operation; and an actuator which includes a motor that provides rotational force for moving the piston, the method including: providing a reaction force generating mechanism which generates reaction force applied against straight moving force of the piston and applies the reaction force to the piston when the piston moves backward in the axial direction, the reaction force being applied in a direction in which the braking operation is released; rotating the motor in a reverse direction, by a controller, in which the braking operation is released so as to allow the piston to move backward in the axial direction; detecting motor operating state information by using a sensor while the operation of the motor is controlled so that the piston moves backward in the axial direction; and estimating, by the controller, a motor torque constant that represents a correlation between motor electric current and motor rotational torque, based on the detected motor operating state information.

In still another aspect, the present invention provides a method of controlling an electromechanical brake device, which includes: a piston which moves forward in an axial direction so as to press a friction pad for clamping a disc at a time of performing a braking operation and moves backward in the axial direction at a time of releasing the braking operation; an actuator which includes a motor that provides rotational force for moving the piston; and a reaction force generating mechanism which generates reaction force applied against straight moving force of the piston and applies the reaction force to the piston when the piston moves backward in the axial direction, the reaction force being applied in a direction in which the braking operation is released, the method including: rotating the motor in a reverse direction by a controller, in which the braking operation is released so as to allow the piston to move backward in the axial direction; detecting motor operating state information by using a sensor while the operation of the motor is controlled so that the piston moves backward in the axial direction; estimating, by the controller, a motor torque constant which represents a correlation between motor electric current and motor rotational torque, based on the detected motor operating state information; and controlling, by the controller, electric current applied to the motor so as to generate desired motor rotational torque by using the estimated motor torque constant.

According to the electromechanical brake device and the method of controlling the same according to the present invention, the motor torque constant, which represents a correlation between motor electric current and rotational torque, is estimated in accordance with predetermined estimation logic, and thereafter, motor electric current is controlled by using the estimated motor torque constant at the time of performing the braking operation, and as a result, it is possible to control clamping force and braking force of the electromechanical brake device even at the time of a breakdown of the force sensor.

Therefore, at the time of a breakdown of the force sensor, it is possible to ensure braking performance and stability and improve braking safety.

In addition, even in a case in which no force sensor is mounted, the motor torque constant may be estimated in accordance with predetermined estimation logic, and then clamping force and braking force of the electromechanical brake device may be controlled by using the motor torque constant, and as a result, it is possible to omit the force sensor and thus reduce costs.

Other aspects and preferred embodiments of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

Figure 1:
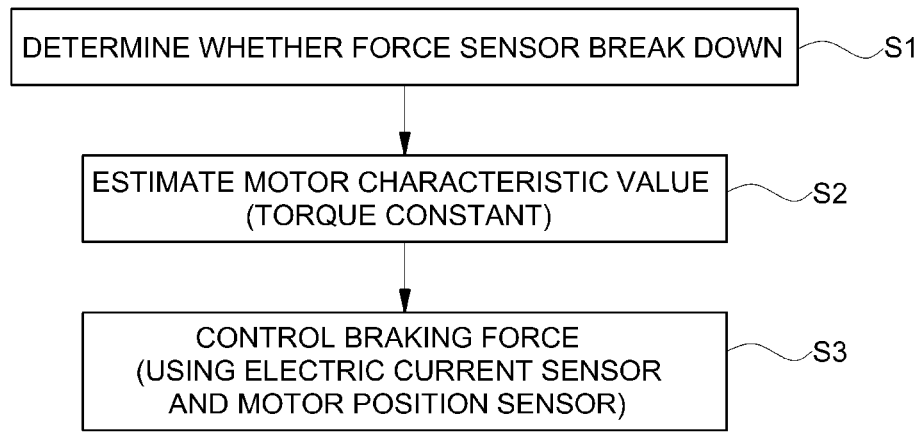
FIG. 1 is a flowchart of a process of controlling braking force at the time of a breakdown of a force sensor in an electromechanical brake device equipped with the force sensor, according to an exemplary embodiment of the present invention.

In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereinafter, exemplary embodiments of the present invention will be described in detail with reference to the accompanying drawings so that those skilled in the art to which the present invention pertains may easily carry out the exemplary embodiments. However, the present invention is not limited to the exemplary embodiments to be described below and may be specified as other aspects.

An electromechanical brake device controls an electric motor, which is a driving source for generating braking force, and in more detail, the electromechanical brake device controls clamping force and braking force by controlling rotational torque of the electric motor.

A motor position sensor (motor rotation angle sensor) and an electric current sensor are basically used to control the electric motor, and further, a force sensor is used to detect clamping force generated by the motor during a process of controlling braking force.

In the present invention, detection values detected by the motor position sensor and the electric current sensor may also be used to estimate motor characteristics, that is, a motor torque constant as described below.

The clamping force detected by the force sensor in the electromechanical brake device may be used as feedback information at the time of controlling the electric motor for generating braking force, but at the time of a breakdown of the force sensor, it is impossible to detect the clamping force, and thus it is impossible to control the clamping force and the braking force by controlling the electric motor.

Therefore, at the time of a breakdown of the force sensor, the present invention estimates a motor torque constant that represents motor characteristics required to control the electric motor (control the braking force), that is, a correlation between motor electric current and motor rotational torque, and uses the estimated motor torque constant so as to control electric current to be applied to the electric motor in order to generate desired motor rotational torque.

For reference, motor characteristics may be changed due to manufacturing variation and when durability is changed, and therefore, it is necessary to consider the changed motor characteristics in order to control braking force when the braking force is controlled by using the motor characteristics.

Therefore, at the time of a breakdown of the force sensor, the present invention estimates the current motor characteristics, that is, the motor torque constant by using motor operating state information detected by other sensors in accordance with separate estimation logic, and at a time of performing a braking operation, controls the motor by using the estimated motor torque constant.

Here, the motor operating state information may be a motor rotation angle and motor electric current which are sensor detection information.

In a case in which no force sensor is mounted, the current motor torque constant is estimated by performing the separate estimation logic under a predetermined condition, and then the motor is controlled by using the estimated current motor torque constant at the time of performing the braking operation.

It is possible to cope with a breakdown of the force sensor by controlling the motor by estimating the motor torque constant, and furthermore, it is possible to omit the force sensor.

Hereinafter, as exemplary embodiments of the present invention, there will be described a method of estimating motor characteristics and then controlling braking force at the time of a breakdown of the force sensor in the electromechanical brake device equipped with the force sensor, and a method of estimating motor characteristics and then controlling braking force in the electromechanical brake device in which no force sensor is mounted (the force sensor is omitted).

FIG. 1 is a flowchart of a process of controlling braking force at the time of a breakdown of the force sensor in the electromechanical brake device having the force sensor.

As shown, there are illustrated processes of determining whether the force sensor has broken down (S1), estimating a motor characteristic value, that is, the motor torque constant when it is determined that the force sensor has broken down (S2), and controlling braking force by controlling an operation of the motor for generating desired clamping force and braking force by using the estimated motor torque constant (S3).

As described above, the braking force may be controlled by using the estimated motor torque constant even at the time of a breakdown of the force sensor, and as a result, it is possible to ensure performance and stability at the time of a breakdown of the force sensor, and improve braking safety.

Figure 2:
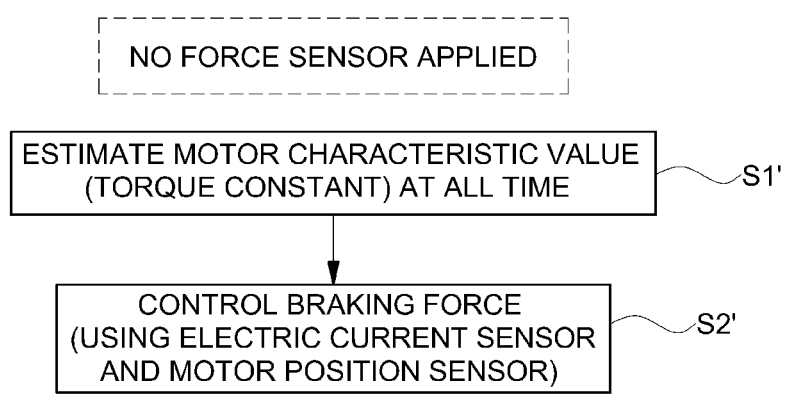
FIG. 2 is a flowchart of a process of controlling braking force in an electromechanical brake device equipped with no force sensor, according to another exemplary embodiment of the present invention.

FIG. 2 illustrates processes of estimating a motor characteristic value, that is, a motor torque constant in accordance with estimation logic when a predetermined logic entry condition is satisfied in the electromechanical brake device equipped with no force sensor (S1'), and controlling braking force by controlling an operation of the motor for generating desired clamping force and braking force by using the estimated motor torque constant (S2').

The control process shown in FIG. 2 may be a kind of sensorless control that does not use the force sensor in a state in which no force sensor is mounted, and the force sensor may be omitted in a case in which this control process is applied.

Meanwhile, prior to describing the control process, the electromechanical brake device according to the exemplary embodiment of the present invention, which may detect a change in motor characteristics and estimate motor characteristics, will be described.

Figure 3A:
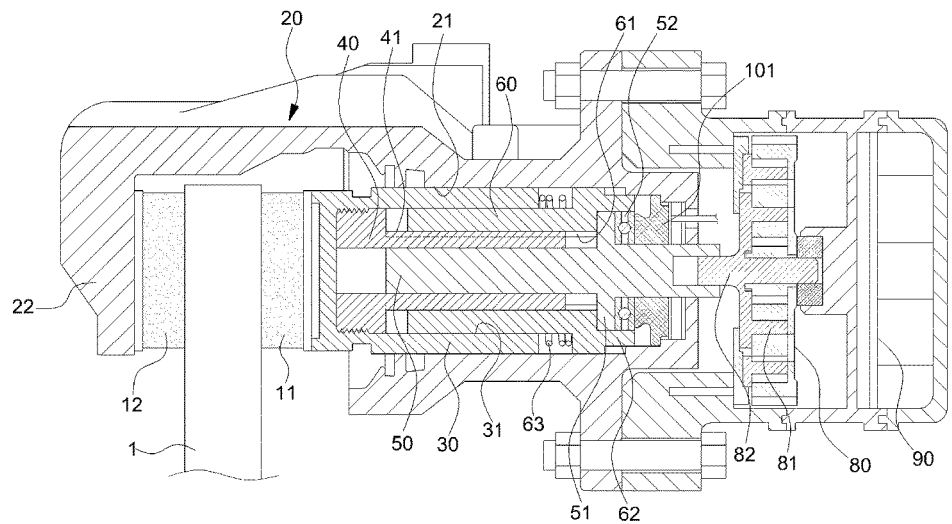
FIGS. 3A and 3B are cross-sectional views illustrating the electromechanical brake device according to the exemplary embodiment of the present invention.
Figure 3B:
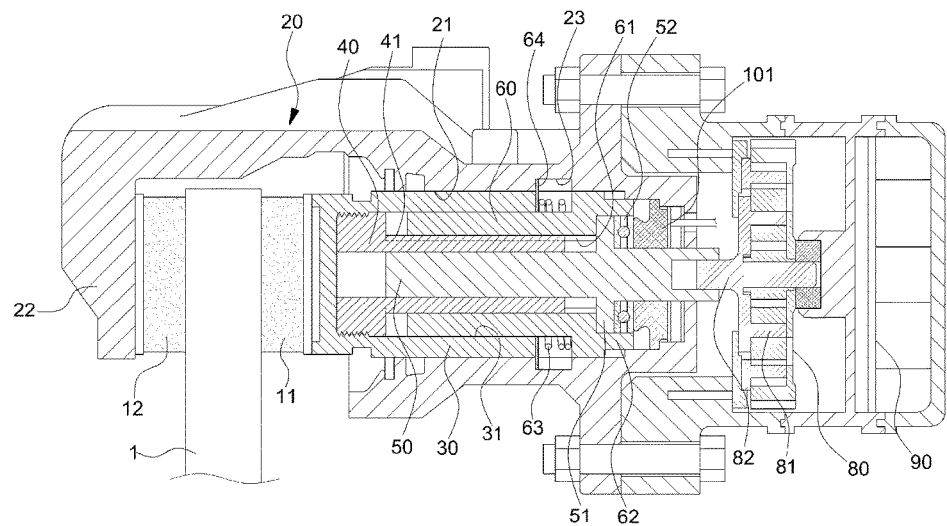

FIGS. 3A and 3B are cross-sectional views illustrating the electromechanical brake device according to the exemplary embodiment of the present invention, and illustrate a reaction force generating mechanism as well as main constituent elements of the electromechanical brake device.

Figure 4:
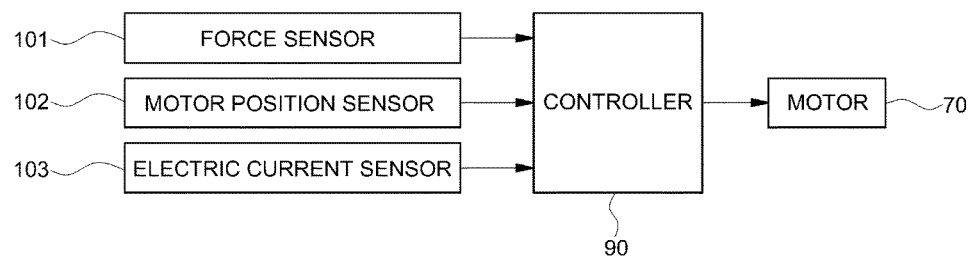
FIG. 4 is a block diagram illustrating a configuration of the electromechanical brake device that performs a control process according to the present invention.

FIG. 4 is a block diagram illustrating a configuration of the electromechanical brake device that performs the control process according to the present invention.

In the illustrated electromechanical brake device, a reaction force generating mechanism is installed, which gradually increases reaction force by applying an elastic member 63 such as a spring into a force transmission structure between a motor 70 and a piston 30, and by allowing the motor 70 to rotate reversely to release braking force.

The motor torque constant may be estimated based on a motor rotation angle (rotor absolute angle position) and motor electric current which are detected by sensors.

Here, the sensors are a motor position sensor 102 which detects a motor rotation angle, and an electric current sensor 103 which detects electric current applied to the motor 70.

A configuration of the illustrated electromechanical brake device will be described. The electromechanical brake device includes a carrier (not shown) which is fixedly installed on a vehicle body, and a caliper housing 20 which is coupled to the carrier so as to be movable forward and backward.

The carrier and the caliper housing 20 are disposed to surround one side of a disc 1 installed in a wheel of a vehicle.

In the carrier, a pair of friction pads (brake pads) 11 and 12, which presses both surfaces of the disc 1 that rotates together with the wheel of the vehicle, is installed to be movable forward and backward.

The pair of friction pads 11 and 12 is installed to be spaced apart from each other, and the disc 1 is disposed between the friction pads 11 and 12.

Therefore, when the piston 30 to be described below operates forward, the friction pads 11 and 12 move toward the disc 1, and cause friction with the disc 1 and simultaneously press the disc 1, thereby performing the braking operation.

The caliper housing 20 is slidably installed on the carrier, and has a cylinder 21 in which the piston 30 is installed.

That is, the hollow cylinder 21 is formed at one side of the caliper housing 20, and the piston 30 is installed in the cylinder 21 so as to be movable forward and backward.

The piston 30 moves forward to move one friction pad 11 of the pair of friction pads 11 and 12 forward toward the disc 1, such that the friction pad 11 causes friction with the disc 1.

A finger portion 22, which moves the other friction pad 12 forward toward the disc 1 so that the friction pad 12 causes friction with the disc 1, is formed at another side of the caliper housing 20.

Therefore, the piston 30 moves forward toward the friction pad 11 and the disc 1 by force transmitted for the braking operation and then presses the one friction pad 11 against the disc 1, and the caliper housing 20 moves in a direction opposite to the movement direction of the piston 30 by reaction force applied between the piston 30 and the one friction pad 11 such that the finger portion 22 of the caliper housing 20 presses the other friction pad 12 against the disc 1.

Therefore, the two friction pads 11 and 12 are pressed against both surfaces of the disc 1 at the same time.

In this case, the braking operation is performed by frictional force generated between the two friction pads 11 and 12 and the disc 1, and braking force is generated to restrict the wheel so that the wheel cannot be rotated by the frictional force.

The force with which the piston 30 and the finger portion 22 of the caliper housing 20 press the friction pads 11 and 12 against both surfaces of the disc 1 may be referred to as clamping force of the caliper housing 20.

Meanwhile, the electromechanical brake device includes a drive unit for operating the piston 30, and the drive unit includes an actuator which generates and transmits rotational force for generating braking force, and a power converting mechanism which converts rotational force transmitted from the actuator into translational force and transmits the translational force to the piston 30 installed in the cylinder 21 of the caliper housing 20 so as to allow the piston 30 to move forward and backward in an axial direction.

Here, the power converting mechanism may include a nut member 40 which is coupled to the piston 30 installed in the cylinder 21 of the caliper housing 20 and moves forward and backward in the axial direction (moves straight forward and backward) so as to allow the piston 30 to move forward and backward in the axial direction, and a spindle 50 which is thread-coupled to the nut member 40 and rotates to allow the nut member 40 to move forward and backward (move straight forward and backward).

The actuator includes the electric motor (designated by reference numeral 70 in FIG. 4) which generates rotational force for generating braking force, and a gear assembly 80 which is disposed between a rotating shaft of the electric motor 70 and the power converting mechanism and transmits rotational force of the electric motor 70 to the power converting mechanism.

In this case, the gear assembly 80 is disposed between the rotating shaft of the electric motor 70 and the spindle 50 of the power converting mechanism, and configured to transmit rotational force of the electric motor 70 to the spindle 50.

In this configuration, the actuator generates rotational force for generating braking force and transmits the rotational force to the spindle 50, thereby rotating the spindle 50.

The drive unit further includes a guide member 60 which is fixedly installed in the caliper housing 20 so as to restrict the rotation of the nut member 40 and guide the forward and rearward axial movement of the nut member 40.

First, the piston 30 in the caliper housing 20 has a hollow portion 31 which is formed in the piston 30 so as to be elongated in the axial direction (i.e., longitudinal direction), and the nut member 40 is installed and coupled in the hollow portion 31 of the piston 30.

The piston 30 and the nut member 40 are configured to integrally move forward and backward in the axial direction.

The nut member 40 may have an elongated cylindrical shape, a guide protrusion 41 protrudes on an outer surface of the nut member 40 so as to be elongated in the longitudinal direction (i.e., axial direction), and the guide protrusion 41 of the nut member 40 is coupled to a guide groove 61 of the guide member 60 fixedly installed on an inner surface of the cylinder 21 of the caliper housing 20.

The guide member 60 may have an elongated cylindrical shape, and has one side fixed to the caliper housing 20, and another side inserted into the hollow portion 31 of the piston 30 so as to accommodate the nut member 40 therein.

The guide groove 61 of the guide member 60 is formed in an inner surface of the guide member 60 so as to be elongated in the longitudinal direction (i.e., axial direction), and the forward and backward axial movement (forward and backward straight movement) of the nut member 40 is guided in a state in which the guide protrusion 41 is inserted into the guide groove 61.

Since the guide member 60 is completely fixed and mounted on the inner surface of the cylinder 21 of the caliper housing 20 so that the guide member 60 cannot rotate and move forward and backward, the nut member 40, which has the guide protrusion 41 coupled to the guide groove 61 of the guide member 60, is only movable forward and backward in the axial direction inside the guide member 60, but cannot rotate because the nut member 40 is restricted by the guide member 60 in a rotation direction.

Screw threads are processed and formed on an inner circumferential surface of the nut member 40, and screw threads, which may be thread-coupled to the nut member 40, are processed and formed on an outer circumferential surface of the spindle 50, such that the nut member 40 may move forward and backward in the axial direction when the spindle 50 rotates.

The spindle 50 is thread-coupled to the interior of the nut member 40, and as a result, rotational force of the spindle 50 may be converted into forward and backward translational force of the nut member 40.

Therefore, when the spindle 50 rotates, the nut member 40 may move straight forward and backward in the axial direction by being guided by the guide member 60.

In this configuration, the piston 30 is installed between the friction pad 11 and the nut member 40, and transmits translational force of the nut member 40 to the friction pad 11.

The spindle 50 is coupled to a shaft 82 of an output gear 81 of the gear assembly 80 so as to be able to transmit rotational force, and a support portion 51 having a shape enlarged in a radial direction protrudes at a rear end portion of the spindle 50.

The electric motor 70 of the drive unit is a driving source which generates driving power, that is, rotational force for performing the braking operation (pressing the friction pad) and releasing the braking operation (reducing pressure on the friction pad), and rotates forward at the time of pressing the friction pad and backward at the time of reducing pressure on the friction pad, such that the electric motor 70 generates forward rotational force and backward rotational force and provides the forward rotational force and the backward rotational force to the spindle 50 through the gear assembly 80.

The operation of the electric motor 70 is controlled by a controller 90, and the controller 90 controls the forward and backward operations of the electric motor 70.

The gear assembly 80 is a constituent element that reduces a rotational speed of the motor 70, amplifies rotational force of the motor 70, and then transmits the rotational force to the spindle 50, and may be configured as a gear train including a combination of a plurality of gears.

The electric motor 70 and the gear assembly 80 may be those applied to a publicly known electromechanical brake device, and in the gear assembly 80, the spindle 50 is coupled to the shaft 82 of the output gear 81 that finally outputs rotational force of the motor 70.

As described above, the guide member 60 is installed to be completely fixed to the inner surface of the cylinder 21 of the caliper housing 20, and may have an elongated container shape, for example, a cylindrical shape so that the nut member 40 may be guided in the axial direction in a state in which the nut member 40 is inserted into the guide member 60, and the nut member 40 and the spindle 50 coupled to the nut member 40 pass through the interior of the guide member 60.

An enlarged portion 62, which has a cylindrical shape enlarged in the radial direction, is formed at a rear end portion of the guide member 60, and the support portion 51 of the spindle 50 is accommodated and positioned inside the enlarged portion 62.

In this case, the enlarged portion 62 of the guide member 60 is fixed to the inner surface of the cylinder 21 of the caliper housing 20, and a front portion of the enlarged portion 62 of the guide member 60 is inserted into the hollow portion 31 of the piston 30 and then coupled to the outer surface of the nut member 40.

A force sensor 101, which is coupled to a rear side of the support portion 51 of the spindle 50 and detects force at the time of performing the braking operation, which is applied through the support portion 51, that is, clamping force, is installed at a rear side in the cylinder 21 of the caliper housing 20.

When the clamping force, which is generated by the operation of the motor 70, is applied to the disc 1 through the friction pads 11 and 12 at the time of performing the braking operation, reaction force, which is applied against the clamping force applied to the disc 1, is transmitted and inputted to the force sensor 101 through the piston 30, the nut member 40, and the spindle 50 (support portion), and the reaction force transmitted and inputted to the force sensor 101 has the same magnitude as the clamping force, and the reaction force (clamping force) is detected by the force sensor 101.

In FIG. 3, reference numeral 52 indicates a bearing 52 installed between the support portion 51 of the spindle 50 and the force sensor 101 at the rear of the support portion 51, and the bearing 52 rotatably supports the spindle 50 through the support portion 51 in the force sensor 101.

In this configuration, the piston 30 and the nut member 40 coupled to the piston 30 are moving components, that is, moving units which are moved by rotational force of the motor 70 in the electromechanical brake device, and the caliper housing 20 and the guide member 60 fixedly installed in the caliper housing 20 are fixed components, that is, fixed units which are relatively fixed based on a motor position.

Meanwhile, a reaction force generating mechanism is installed to generate reaction force when the motor 70 rotates reversely in a direction in which the braking operation is released, and the reaction force may be referred to as force applied against straight moving force of the piston 30 that moves backward in the axial direction when the motor 70 rotates reversely.

In the present invention, the reaction force generating mechanism generates reaction force and applies the reaction force to the piston when the piston moves in a direction in which the braking operation is released, that is, when the piston moves backward in the axial direction, and in the exemplary embodiment, and the reaction force generating mechanism may be configured by installing the elastic member 63 between the moving unit and the fixed unit.

In more detail, the reaction force generating mechanism may be configured by installing the elastic member 63, that is, a spring, between the piston 30, which is the moving unit, and one side of the caliper housing 20 (including components fixed to the caliper housing) which is the fixed unit.

In this case, the spring 63 may be installed between the piston 30 and the enlarged portion 62 of the guide member 60 fixedly installed in the caliper housing 20.

As described above, the elastic member 63 is applied into the force transmission structure including the motor 70 and the piston 30 so as to gradually increase reaction force when the motor 70 rotates reversely, and the reaction force generating mechanism is used to estimate a motor torque constant based on a change in electric current in accordance with a motor rotation angle.

The estimation of the motor torque constant will be described below.

First, reaction force of the spring (elastic member) may be a function of a motor torque constant and motor electric current applied to the motor, and motor rotational torque may be defined by the following Expression 1.

Motor Rotational Torque=Motor Torque Constant×Motor Electric Current  [Expression 1]

A relationship formula between motor torque and clamping force may be defined by the following Expression 2.

Motor Rotational Torque×Reduction Ratio×Gear Efficiency×2π×Spindle Efficiency=Clamping Force×Spindle Lead  [Expression 2]

Clamping force may be defined by the following Expression 3.

Clamping Force=Spring Constant×Spindle Movement Distance=Spring Constant×(Motor Rotation Angle×Spindle Lead)/(Reduction Ratio×2π)  [Expression 3]

As a result, the following Expressions 4 and 5 regarding a motor torque constant may be obtained from Expressions 2 and 3.

Motor Torque=Motor Rotation Angle×K=Motor Torque Constant×Electric Current  [Expression 4]

Motor Torque Constant=(Motor Rotation Angle/Electric Current)×K  [Expression 5]

Here, the spring constant is a spring constant of the spring 63 installed between the elastic member, that is, the piston 30 of the reaction force generating mechanism and one side of the caliper housing 20, and the spring constant is inputted to the controller 90 and used to estimate a motor torque constant.

The reduction ratio is a reduction ratio determined in accordance with the configuration of gears of the gear assembly 80, and the reduction ratio is a ratio of an output speed (rotational speed of the output gear and the spindle) to an input speed (rotational speed of the motor and the input gear). The reduction ratio is also inputted to the controller 90 and used to estimate a motor torque constant.

The K is a predetermined value, that is, 'K=Spring Constant×(Spindle Lead/(Reduction Ratio×2π))²×Gear Efficiency×Spindle Efficiency'.

The motor rotation angle is sensor detection information detected by the motor position sensor 102, and the motor electric current is electric current applied to the motor 70, that is, sensor detection information detected by the electric current sensor 103.

As a result, the controller 90 may estimate a motor torque constant by using the sensor detection information as indicated by Expression 2, that is, a motor rotation angle and motor electric current which are detected by the motor position sensor 102 and the electric current sensor 103, respectively, and a spring constant and a reduction ratio which are information inputted, stored and set in advance.

The estimation logic rotates the motor 70 reversely in the direction in which the braking operation is released in order to estimate a motor torque constant, and as the spindle 50 rotates reversely when the motor 70 rotates reversely, the nut member 40 and the piston 30 integrally move backward.

In this case, the spring 63 of the reaction force generating mechanism is compressed by the piston 30, and when the spring 63 is compressed, the piston 30 receives, from the spring, force of the spring, that is, reaction force when the piston moves backward.

A motor characteristic value, that is, a motor torque constant may be estimated by detecting a motor rotation angle and motor electric current during the process in which the spring is compressed as described above, and the motor torque constant is determined by a relationship between the motor rotation angle and the motor electric current which are monitored during the process in which the spring is compressed.

FIG. 3A is a cross-sectional view of the electromechanical brake device which is set such that a state in the reaction force generating mechanism is changed to a no-load state from an initial state in which the spring is not compressed by the piston 30, and FIG. 3B is a cross-sectional view of the electromechanical brake device which is set to a state in which the spring is compressed from the initial state.

In the electromechanical brake device shown in FIG. 3B, a spring mounting groove 23 is formed in an inner surface at the rear side of the cylinder 21 of the caliper housing 20 within a predetermined axial longitudinal section, and a ring-shaped spring seat 64 is installed in the spring mounting groove 23.

The spring is installed between the spring seat 64 and the enlarged portion 62 of the guide member 60 so as to constitute the reaction force generating mechanism, and in this case, the spring seat 64 is installed to be caught by a front end of the spring mounting groove 23 in a state in which the spring 63 installed between the spring seat 64 and the enlarged portion 62 of the guide member 60 is compressed.

However, the spring seat 64 is installed to have a structure protruding into the cylinder 21 of the caliper housing 20 inside the spring mounting groove 23, and as a result, the piston 30, which moves backward when the motor 70 rotates reversely, may push the spring seat 64 rearward.

As a result, as the piston 30 moves backward and pushes the spring seat 64, the spring 63 is additionally compressed.

Figure 5:
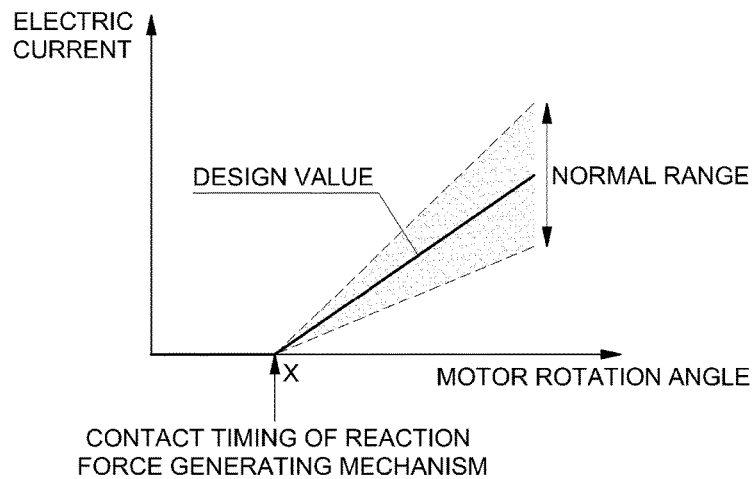
FIGS. 5 and 6 are graphs illustrating a motor rotation angle and motor electric current in the present invention.
Figure 6:
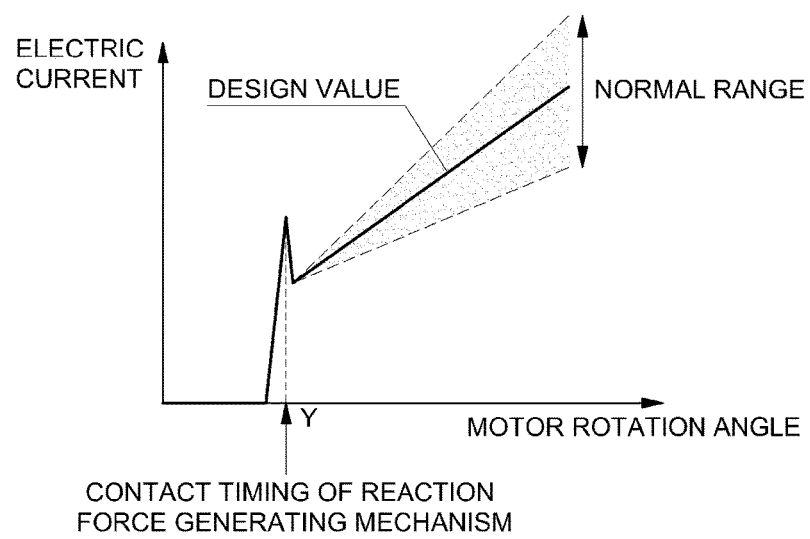

Meanwhile, FIGS. 5 and 6 are graphs illustrating a motor rotation angle and motor electric current. FIG. 5 is a graph in a case in which an initial state is set as a no-load state (spring no-load setting) in which the spring is not compressed like the electromechanical brake device shown in FIG. 3A, and FIG. 6 is a graph in a case in which an initial state is set as a state (spring initial compression setting) in which the spring is compressed like the electromechanical brake device shown in FIG. 3B.

In the following description, contact with the reaction force generating mechanism means that the spring 63 begins to be compressed, and particularly, means that the spring 63 begins to be compressed and reaction force begins to be generated by the reaction force generating mechanism, and also means that the reaction force generated by the reaction force generating mechanism begins to be applied to the piston 30.

Contact timing of the reaction force generating mechanism means a point at which the spring 63 begins to be compressed by the piston 30.

Referring to FIG. 5, when the motor 70 rotates reversely and the piston 30 moves backward in order to release the braking operation in a braking state in which the friction pads 11 and 12 press the disc 1 in order to generate braking force, the motor 70 rotates somewhat, and then the spring 63 of the reaction force generating mechanism begins to be compressed.

The electric current to be applied to motor 70 in order to press the spring is increased after the contact of the reaction force generating mechanism when the spring 63 begins to be compressed as described above, and a point at which the motor electric current begins to increase becomes a point of time at which the contact of the reaction force generating mechanism is carried out (in this case, a motor rotation angle is 'X').

As shown in FIG. 5, when the spring 63 begins to be compressed, the motor electric current tends to increase as the motor rotation angle increases to compress the spring, and a gradient of the straight line in the graph, which represents a rate of a change in the motor electric current with respect to the motor rotation angle (a change in motor electric current according to a change in motor rotation angle), is determined by the current motor torque constant.

The motor characteristics are changed as durability of the motor is changed, and a gradient of the straight line is changed as the motor characteristics are changed.

As described above, the gradient of the straight line is information associated with the motor characteristics, and therefore, a change in motor characteristics may be predicted from the changes in state and gradient, and furthermore, the motor torque constant may be corrected.

The straight solid line in the graph in FIG. 5 indicates reference set information (design value) that represents a relationship between the motor rotation angle and the motor electric current when durability of the motor is not changed, and in accordance with the set information as shown in FIG. 5, a gradient (hereinafter, referred to as a 'reference gradient') associated with the motor characteristics that serve as a criteria may be set.

As a result, in a state in which this set information is inputted and stored in the controller 90 in advance, the controller 90 may correct the motor torque constant as much as the amount of change in gradient by comparing the set reference gradient with the gradient of the straight line, which represents a relationship between the motor rotation angle and the motor electric current which are actual sensor detection information.

This correction of the motor torque constant may be carried out in a manner in which the controller compares the reference gradient, which is set information, with a gradient obtained from the sensor detection information in a state in which correction values corresponding to the amount of change in gradient are preset in the controller, obtains a correction value corresponding to the amount of change in gradient (a difference value between the obtained gradient and the reference gradient), and then corrects the estimated motor torque constant as much as the correction value.

If the motor torque constant, which is changed in accordance with a change in motor characteristics, may be periodically corrected as described above, correct clamping force and correct braking force may be calculated by using the motor torque constant after correcting the motor torque constant, and as a result, it is possible to omit the force sensor 101 or to cope with a breakdown of the force sensor.

Two dotted lines in the graph in FIG. 5, which have predetermined gradients, represent a normal range in which the motor 70, the controller 90, or the like is normally operated, and the case where the graph and the data associated with the motor rotation angle vs. the electric current deviate from the normal range means a breakdown state in which the motor, the controller, or the like is not normally operated.

FIG. 6 illustrates a state in which the spring is set to be initially compressed, and this state has no difference from the state in FIG. 5 except that since the spring is compressed in the initial state, a large amount of electric current instantaneously is required (a region of FIG. 6 in which electric current rapidly increases) at a point at which the contact of the reaction force generating mechanism is carried out, that is, at a point at which the spring begins to be additionally compressed in a state in which the spring is initially compressed.

The additional amount of electric current, which is required to allow the spring to overcome the compressed state and begin to be additionally compressed, is indicated by a portion in the graph in FIG. 6 where the motor electric current rapidly increases.

In FIG. 6, a point (in this case, the motor rotation angle is 'Y') at which the motor electric current reaches a peak value becomes the contact timing of the reaction force generating mechanism, that is, a point at which the spring begins to be additionally compressed in the initial state in which the spring is compressed.

Two dotted lines in the graph in FIG. 6, which have predetermined gradients, represent a normal range in which the motor 70, the controller 90, or the like is normally operated, and the case where the graph and the data associated with the motor rotation angle vs. the electric current deviate from the normal range means a breakdown state in which the motor, the controller, or the like is not normally operated.

With the same method as the no-load setting shown in FIG. 5, the motor torque constant may be corrected even in the case of the spring initial compression setting shown in FIG. 6, and with the same method as shown in FIG. 5, the controller 90 corrects the motor torque constant by comparing the set reference gradient with the gradient of the straight line that represent a relationship between the motor rotation angle and the motor electric current which are detected by the sensors 102 and 103, respectively.

A change in motor characteristics may be estimated by monitoring changes in motor rotation angle and motor electric current while the spring 63 is compressed from the point at which the contact of the reaction force generating mechanism is carried out as described above, and the motor torque constant may be corrected by using the estimated change in motor characteristics.

As shown in FIGS. 5 and 6, whether the contact of the reaction force generating mechanism is carried out, that is, whether the spring begins to be compressed may be determined based on the motor rotation angle and the motor electric current which are sensor detection information.

Hereinafter, a process of controlling the electromechanical brake device according to the exemplary embodiment of the present invention will be described more specifically.

Figure 7:
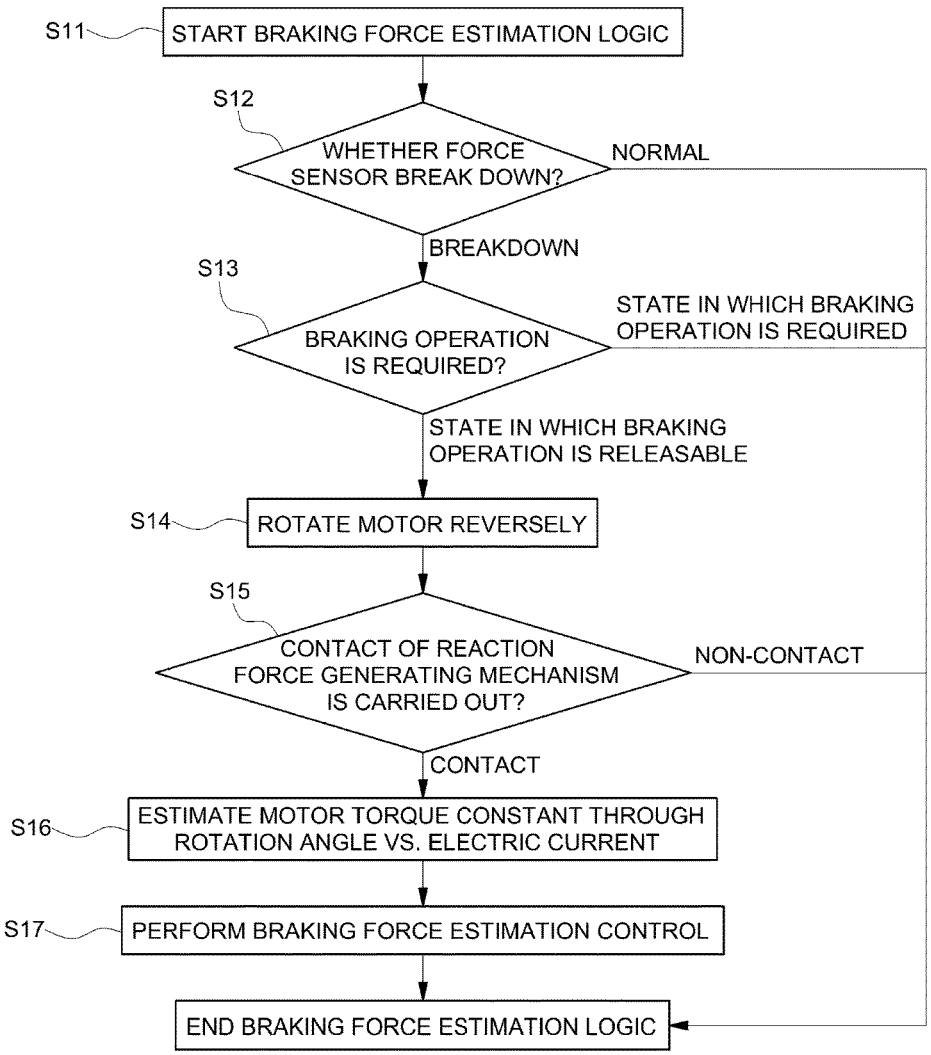
FIG. 7 is a flowchart illustrating a fail-safe control process at the time of a breakdown of the force sensor according to the exemplary embodiment of the present invention.

FIG. 7 is a flowchart illustrating a fail-safe control process at the time of a breakdown of the force sensor in more detail, and first, when the braking force estimation logic starts (S11), the controller 90 determines whether the force sensor 101 has broken down (S12).

Whether the force sensor 101 has broken down may be determined by using detection information from the force sensor 101 and the electric current sensor 103, and the controller 90 determines whether the force sensor has broken down by checking whether the detection value of the force sensor 101 is within the set normal range corresponding to the detection value of the electric current sensor 103.

In this case, the controller 90 determines that the force sensor is normal when the detection value of the force sensor 101 is within the normal range, and determines that the force sensor has broken down when the detection value of the force sensor 101 deviates from the normal range.

Figure 9:
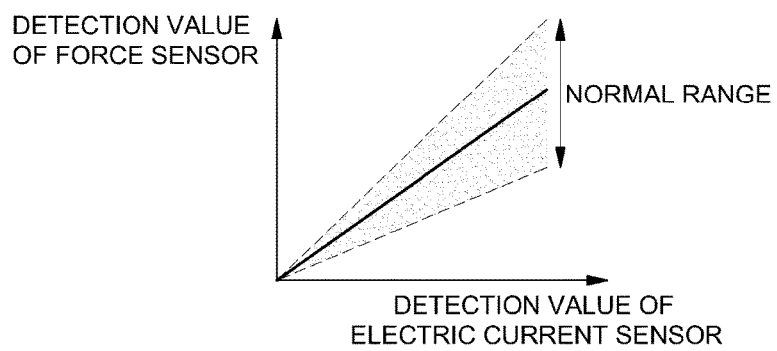
FIG. 9 is a view illustrating an example in which a normal range of a detection value of a force sensor is set in the present invention.

FIG. 9 is a view illustrating an example in which the normal range of the detection value of the force sensor is set, and as shown, the motor electric current value detected by the electric current sensor and the clamping force value detected by the force sensor are monitored (the detection value of the electric current sensor vs. the detection value of the force sensor are monitored), and it is checked whether the clamping force value detected by the force sensor is within the normal range corresponding to the motor electric current value detected at the same point.

Alternatively, the controller compares the set normal gradient range with a gradient which represents a change in detection value of the force sensor with respect to a change in detection value of the electric current sensor, and may determine that the force sensor is normal when the gradient is within the normal gradient range, and may determine that the force sensor has broken down when the gradient deviates from the normal gradient range.

The two straight dotted lines in the graph in FIG. 9 define an upper limit value and a lower limit value of the normal range, and the force sensor is in a normal state when straight line data obtained from the detection values from the electric current sensor and the force sensor is positioned between the two dotted lines which define the upper limit value and the lower limit value of the normal range (when the gradient of the straight line of the detection value is a value between the gradients of the two dotted lines), and the force sensor is in a breakdown state when the gradient deviates from a region between the two dotted lines.

When it is determined that the force sensor is in the breakdown state as described above, the estimation logic for estimating the motor torque constant starts. First, whether the current situation is a situation in which the braking operation is required to generate braking force is determined (S13), and when the current situation is in a state in which the braking operation may be released and it is not necessary to generate braking force, the controller 90 rotates the motor 70 reversely in order to release the braking operation in a state in which the braking operation has already been carried out (i.e., in a parking braking state) (S14).

Next, the controller 90 monitors the motor rotation angle and the motor electric current which are detected by the sensors 102 and 103, respectively, while the motor 70 rotates reversely, and determines whether the contact of the reaction force generating mechanism is carried out (whether the spring begins to be compressed) (S15).

Whether the contact of the reaction force generating mechanism is carried out may be determined based on the motor rotation angle and the motor electric current, which are sensor detection information monitored, as described above with reference to FIGS. 5 and 6, and may be determined by checking a change in motor electric current with respect to a change in motor rotation angle.

When the contact of the reaction force generating mechanism is carried out, that is, when the spring 63 of the reaction force generating mechanism begins to be compressed as the motor rotates reversely and the piston moves backward, the motor electric current tends to increase as the motor rotation angle increases, and in the case of the initial spring no-load setting, it can be determined that the contact of the reaction force generating mechanism is carried out (the spring begins to be compressed) when the motor electric current begins to increase as the motor rotation angle increases, as shown in FIG. 5.

In the case of the spring initial compression setting, a large amount of electric current is instantaneously required (peak electric current occurs) at the point at which the spring begins to be additionally compressed as the motor rotation angle increases, as shown in FIG. 6, and as a result, when the electric current rapidly increases, it may be determined that the contact of the reaction force generating mechanism is carried out (the spring begins to be compressed).

Referring to FIG. 6, a point at which peak electric current occurs is a point at which the contact of the reaction force generating mechanism is carried out (a point in time in which the spring begins to be compressed).

When the contact of the reaction force generating mechanism is carried out as described above, the controller 90 estimates the motor torque constant based on the sensor detection information and the set information (S16), and obtains the motor torque constant in accordance with Expression 2 by using the motor rotation angle and the motor electric current which are detected by the sensors 102 and 103, respectively, and the spring constant and the reduction ratio (or the K value) which are set information.

The controller 90 corrects the initial motor torque constant, which is obtained as described above, by using the motor rotation angle and the motor electric current which are detected by the sensors 102 and 103, and the predetermined reference gradient.

As a result, the corrected motor torque constant is determined as the finally estimated motor torque constant and then stored in the controller 90, and thereafter, the controller 90 controls the generation of braking force of the electromechanical brake device by using the motor torque constant (the corrected motor torque constant), which is finally estimated and stored, at the time of performing the braking operation (S17).

That is, when braking force required for performing the braking operation is determined, the controller 90 determines motor rotational torque (=motor torque constant ×motor electric current) corresponding to required braking force, and controls motor electric current for satisfying the motor rotational torque by using the motor torque constant.

As described above, the operation of the motor 70 is controlled by an electric current control method, and as a result, desired clamping force and desired braking force ('braking force=clamping force×a coefficient of friction between the friction pad and the disc') are generated.

Figure 8:
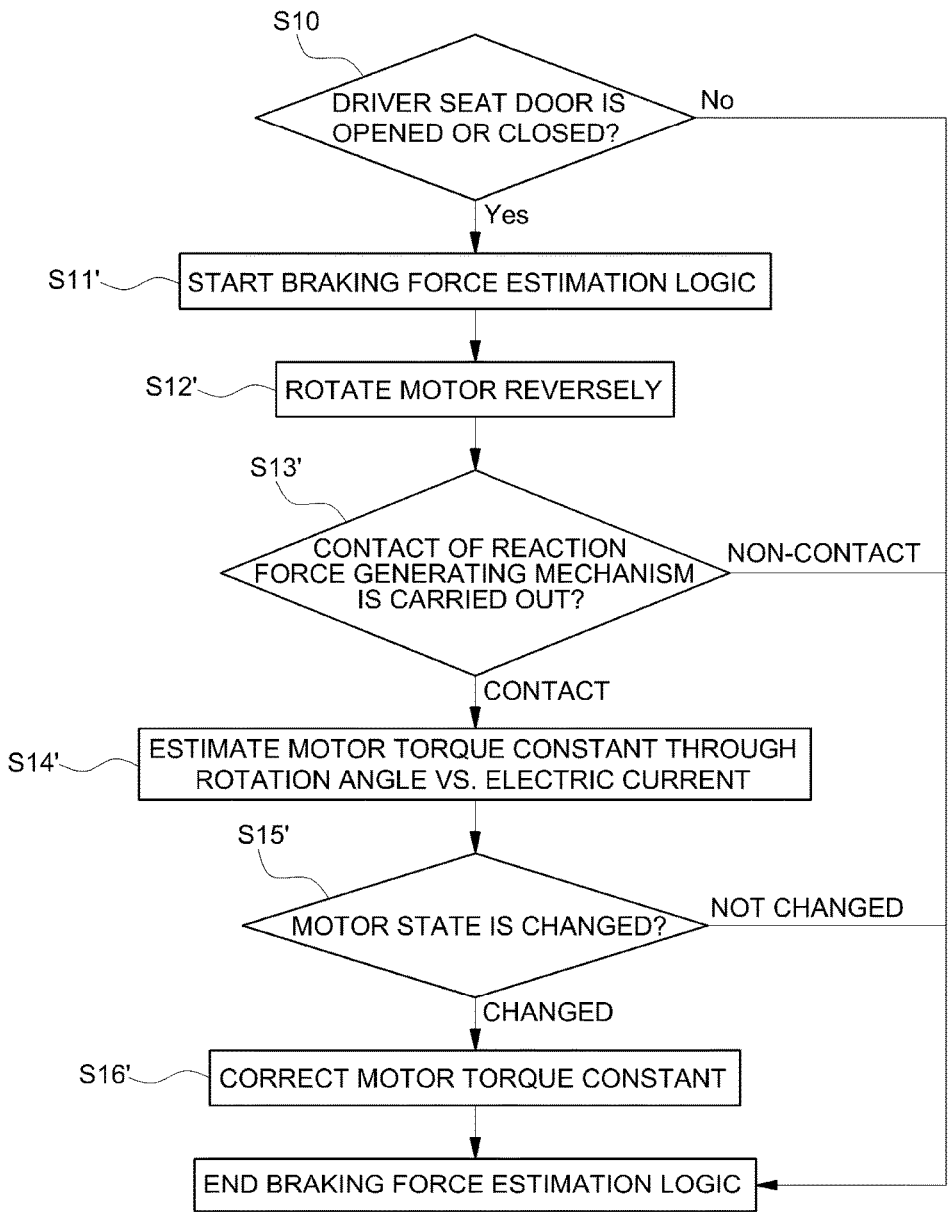
FIG. 8 is a flowchart illustrating a control process in a case in which no force sensor is mounted according to another exemplary embodiment of the present invention.

Meanwhile, FIG. 8 is a flowchart illustrating a process of controlling the electromechanical brake device mounted without force sensor, and the estimation logic for estimating the motor torque constant starts when the vehicle is parked.

The braking operation of the corresponding electromechanical brake device needs to be temporarily released in order to estimate the motor torque constant, and in order to prevent the vehicle from being pushed downward on a slope when the vehicle is parked on the slope even though the vehicle is parked, the motor torque constant needs to be sequentially estimated for the electromechanical brake devices installed in all of the wheels.

To this end, in a case in which a top controller (not shown) confirms from an inclination angle sensor (not shown) of the vehicle that the vehicle is parked on the slope, the top controller communicates with the controller 90 installed in each of the electromechanical brake devices, and cooperatively controls the controller 90 so that the motor torque constant is sequentially estimated.

In this case, in a case in which the motor torque constant is estimated for the electromechanical brake device installed in one wheel, the electromechanical brake devices installed in the remaining wheels maintain performing the braking operations, and in a case in which the estimation of the motor torque constant for the electromechanical brake device installed in one wheel is completed, the motor torque constant is estimated for the electromechanical brake devices installed in the remaining wheels.

As described above, in accordance with the predetermined order, the motor torque constant is sequentially estimated for the electromechanical brake devices installed in all of the wheels.

FIG. 8 illustrates a process in which the motor torque constant is estimated for one electromechanical brake device. The estimation logic starts in a state in which the vehicle is parked, and the state in which the vehicle is parked may be determined by checking whether a driver seat door has been closed after being opened (S10).

That is, when the controller 90 of the electromechanical brake device receives, from a controller (e.g., BCM) associated with the door, a signal indicating that the driver seat door has been closed after being opened, it may be determined that a driver has closed the door after opening the door and getting out of the vehicle and that the driver has gotten out of the vehicle after parking the vehicle.

As described above, the estimation logic starts in a state in which the vehicle is parked (S11'), and then the controller 90 rotates the motor 70 in the reverse direction in which the braking operation is released (S12').

Next, the controller 90 monitors the motor rotation angle and the motor electric current which are detected by the sensors 102 and 103, respectively, while the motor 70 rotates reversely, and determines whether the contact of the reaction force generating mechanism is carried out (whether the spring begins to be compressed) (S13').

In this case, when it is determined that the contact of the reaction force generating mechanism is carried out, the controller 90 estimates the motor torque constant based on the sensor detection information and the set information (S14'), and obtains the motor torque constant in accordance with Expression 2 by using the motor rotation angle and the motor electric current which are detected by the sensors 102 and 103, respectively, and the spring constant and the reduction ratio (or the K value) which are set information.

Next, whether the motor torque constant obtained as described above differs from the previously stored motor torque constant is determined (S15'), and in a case in which the motor torque constant obtained as described above differs from the previously stored motor torque constant, the controller 90 corrects the obtained motor torque constant by using the motor rotation angle and the motor electric current, which are detected by the sensors 102 and 103, respectively, and the predetermined reference gradient, as described above (S16').

As a result, the corrected motor torque constant is determined as the finally estimated motor torque constant and then stored in the controller 90, and thereafter, the controller 90 controls the generation of braking force of the electromechanical brake device by using the stored motor torque constant (corrected motor torque constant) when the vehicle travels again and then the braking operation is performed.

That is, when braking force required for performing the braking operation is determined, the controller 90 determines motor rotational torque (=motor torque constant× motor electric current) corresponding to required braking force, and controls motor electric current for satisfying the motor rotational torque by using the motor torque constant.

As described above, the operation of the motor 70 is controlled by the electric current control method, and as a result, desired clamping force and desired braking force are generated.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. An electromechanical brake device, comprising:
a piston installed in a caliper housing so as to be movable forward and backward in an axial direction, the piston moving forward in the axial direction so as to press a friction pad for clamping a disc at a time of performing a braking operation, and the piston moving backward in the axial direction at a time of releasing the braking operation;
an actuator including a motor that provides rotational force for moving the piston;
a power converting mechanism that converts the rotational force transmitted from the actuator into translational force, and transmits the translational force to the piston so as to allow the piston to move forward and backward in the axial direction;
a reaction force generating mechanism installed between the piston and one side of the caliper housing, the reaction force generating mechanism generating reaction force applied against straight moving force of the piston, which moves backward in the axial direction, in a direction in which the braking operation is released, and applying the reaction force to the piston;
a guide member which is fixedly installed integrally in the caliper housing so as to restrict rotation of a nut member and guide forward and backward axial movement of the nut member;
a sensor which detects a motor operating state; and
a controller which estimates a motor torque constant that represents a correlation between motor electric current and motor rotational torque, based on motor operating state information detected by the sensor when an operation of the motor is controlled so as to allow the piston to move backward in the axial direction,
wherein the reaction force generating mechanism is configured by installing an elastic member between the piston and one side of the caliper housing, the elastic member being compressed by the piston that moves backward in the axial direction, and
wherein the elastic member is a spring installed between the piston and the guide member fixed to the caliper housing.

2. The electromechanical brake device of claim 1, wherein the controller determines, from the motor operating state information, that the elastic member begins to be compressed, and estimates the motor torque constant based on the motor state information detected in a state in which the elastic member begins to be compressed.

3. The electromechanical brake device of claim 1, wherein the sensor includes a motor position sensor and an electric current sensor, and the motor operating state information includes a motor rotation angle detected by the motor position sensor, and electric current applied to the motor which is detected by the electric current sensor.

4. The electromechanical brake device of claim 1, wherein the guide member is formed in a container shape, and has one side which is fixed to the caliper housing, and another side which is coupled to the nut member so as to accommodate the nut member inserted and coupled into a hollow portion of the piston in a state in which the another side is inserted into the hollow portion, such that the rotation of the nut member is restricted, and the forward and backward axial movement of the nut member is guided.

5. The electromechanical brake device of claim 4, wherein the guide member has an enlarged portion having a cylindrical shape enlarged in a radial direction, the enlarged portion of the guide member is integrally fixed to the caliper housing, and the spring of the reaction force generating mechanism is installed between the piston and the enlarged portion of the guide member.

6. The electromechanical brake device of claim 1, wherein the power converting mechanism includes:
the nut member which is coupled to the piston and moves forward and backward in the axial direction so as to allow the piston to move forward and backward in the axial direction; and
a spindle which is coupled to the actuator so as to be rotated by rotational force transmitted from the actuator, and thread-coupled to the nut member so as to rotate to move the nut member forward and backward in the axial direction.

7. The electromechanical brake device of claim 6, wherein the piston, the nut member, and the spindle are installed in a hollow cylinder formed in the caliper housing, and the guide member is formed in a container shape, and has one side which is fixed to the caliper housing, and another side which is coupled to the nut member so as to accommodate the nut member inserted and coupled into a hollow portion of the piston in a state in which the another side is inserted into the hollow portion, such that the rotation of the nut member is restricted, and the forward and backward axial movement of the nut member is guided.

8. A method of estimating a motor torque constant of an electromechanical brake device, which includes: a piston which moves forward in an axial direction so as to press a friction pad for clamping a disc at a time of performing a braking operation and moves backward in the axial direction at a time of releasing the braking operation; and an actuator which includes a motor that provides rotational force for moving the piston, the method comprising:
providing a reaction force generating mechanism which generates reaction force applied against straight moving force of the piston and applies the reaction force to the piston when the piston moves backward in the axial direction, the reaction force being applied in a direction in which the braking operation is released;
rotating the motor in a reverse direction, by a controller, in which the braking operation is released so as to allow the piston to move backward in the axial direction;
detecting motor operating state information by using a sensor while the operation of the motor is controlled so that the piston moves backward in the axial direction; and
estimating, by the controller, a motor torque constant that represents a correlation between motor electric current and motor rotational torque, based on the detected motor operating state information,
wherein the reaction force generating mechanism is configured by installing an elastic member between the piston and one side of the caliper housing, the elastic member being compressed by the piston that moves backward in the axial direction,
wherein the elastic member is a spring installed between the piston and a guide member fixed to the caliper housing, and
wherein the guide member is fixedly installed integrally in the caliper housing so as to restrict rotation of a nut member and guide forward and backward axial movement of the nut member.

9. The method of claim 8, wherein in the detecting of the motor operating state information, it is determined, from the detected motor operating state information, that the elastic member begins to be compressed and the reaction force generating mechanism begins to generate the reaction force, and then the motor torque constant is estimated based on the motor state information detected in a state in which the elastic member begins to be compressed.

10. The method of claim 8, wherein the motor operating state information includes a motor rotation angle detected by a motor position sensor, and electric current applied to the motor which is detected by an electric current sensor, and it is determined that the elastic member begins to be compressed and the reaction force generating mechanism begins to generate the reaction force when the electric current applied to the motor begins to increase as the motor rotation angle increases.

11. The method of claim 8, wherein the motor operating state information includes:
a motor rotation angle which is detected by a motor position sensor; and
electric current applied to the motor which is detected by an electric current sensor.

12. The method of claim 11, wherein a motor torque constant is calculated and estimated by using the motor rotation angle and the electric current applied to the motor which are detected by the sensors, respectively, a gradient, which represents a rate of a change in the electric current applied to the motor with respect to the motor rotation angle detected by the sensor, is obtained, a correction value corresponding to a difference between the obtained gradient and a predetermined reference gradient is obtained, and a final motor torque constant is determined by correcting the estimated motor torque constant by using the obtained correction value.

13. The method of claim 8, further comprising:
determining whether a vehicle is in a parked state;
wherein when it is determined that the vehicle is in the parked state, allowing the piston to move backward in the axial direction, detecting the motor operating state information, and estimating a motor torque constant based on the detected motor operating state information are performed.

14. The method of claim 13, further comprising:
determining, by an inclination angle sensor, whether the vehicle is parked on a slope when it is determined that the vehicle is in the parked state,
wherein when it is determined that the vehicle is parked on the slope, a process of estimating a motor torque constant, which includes allowing the piston to move backward in the axial direction, detecting the motor operating state information, and estimating a motor torque constant based on the detected motor operating state information, is sequentially performed on the electromechanical brake devices installed in all of the wheels.

15. A method of controlling an electromechanical brake device, which includes: a piston which moves forward in an axial direction so as to press a friction pad for clamping a disc at a time of performing a braking operation and moves backward in the axial direction at a time of releasing the braking operation; an actuator which includes a motor that provides rotational force for moving the piston; and a reaction force generating mechanism which generates reaction force applied against straight moving force of the piston and applies the reaction force to the piston when the piston moves backward in the axial direction, the reaction force being applied in a direction in which the braking operation is released, the method comprising:

rotating the motor in a reverse direction, by a controller, in which the braking operation is released so as to allow the piston to move backward in the axial direction;

detecting motor operating state information by using a sensor while the operation of the motor is controlled so that the piston moves backward in the axial direction;

estimating, by the controller, a motor torque constant which represents a correlation between motor electric current and motor rotational torque, based on the detected motor operating state information; and controlling, by the controller, electric current applied to the motor so as to generate desired motor rotational torque by using the estimated motor torque constant, wherein the reaction force generating mechanism is configured by installing an elastic member between the piston and one side of the caliper housing, the elastic member being compressed by the piston that moves backward in the axial direction, wherein the elastic member is a spring installed between the piston and a guide member fixed to the caliper housing, and wherein the guide member is fixedly installed integrally in the caliper housing so as to restrict rotation of a nut member and guide forward and backward axial movement of the nut member.

16. The method of claim 15, wherein in the detecting of the motor operating state information, it is determined, from the detected motor operating state information, that the elastic member begins to be compressed and the reaction force generating mechanism begins to generate the reaction force, and then the motor torque constant is estimated based on the motor state information detected in a state in which the elastic member begins to be compressed.

17. The method of claim 15, wherein the motor operating state information includes a motor rotation angle detected by a motor position sensor, and electric current applied to the motor which is detected by an electric current sensor, and it is determined that the elastic member begins to be compressed and the reaction force generating mechanism begins to generate the reaction force when the electric current applied to the motor begins to increase as the motor rotation angle increases.

18. The method of claim 15, wherein the motor operating state information includes:

a motor rotation angle which is detected by a motor position sensor; and electric current applied to the motor which is detected by an electric current sensor.

19. The method of claim 18, wherein a motor torque constant is calculated and estimated by using the motor rotation angle and the electric current applied to the motor which are detected by the sensors, respectively, a gradient, which represents a rate of a change in the electric current applied to the motor with respect to the motor rotation angle detected by the sensor, is obtained, a correction value corresponding to a difference between the obtained gradient and a predetermined reference gradient is obtained, and a final motor torque constant is determined by correcting the estimated motor torque constant by using the obtained correction value.

20. The method of claim 15, further comprising:

determining whether a force sensor, which detects clamping force which is force for pressing friction pads against both surfaces of a disc, breaks down, wherein when it is determined that the force sensor breaks down, allowing the piston to move backward in the axial direction, detecting the motor operating state information, estimating the motor torque constant, and controlling electric current applied to the motor are performed.

21. The method of claim 20, wherein the determining of whether the force sensor breaks down includes checking whether the clamping force detected by the force sensor is within a set normal range corresponding to electric current applied to the motor which is detected by an electric current sensor, and determining that the force sensor breaks down when the clamping force deviates from the set normal range.

* * * * *